United States Patent
Gmeiner et al.

(10) Patent No.: US 9,369,851 B2
(45) Date of Patent: Jun. 14, 2016

(54) METHOD, SYSTEM AND APPARATUS FOR LOCATION AND TIME-BASED MESSAGING USING TEXT-BASED TAGS

(71) Applicant: BLACKBERRY LIMITED, Waterloo (CA)

(72) Inventors: Dominik Josef Gmeiner, Toronto (CA); Younghwan Kim, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 14/471,536

(22) Filed: Aug. 28, 2014

(65) Prior Publication Data

US 2016/0066165 A1  Mar. 3, 2016

(51) Int. Cl.
*H04L 12/58* (2006.01)
*H04W 4/12* (2009.01)
*H04W 4/02* (2009.01)

(52) U.S. Cl.
CPC . *H04W 4/12* (2013.01); *H04W 4/02* (2013.01)

(58) Field of Classification Search
CPC ................................. H04W 4/12; H04W 4/02
USPC ............... 455/412.1, 466, 445, 411; 709/206, 709/204; 715/273
See application file for complete search history.

(56) References Cited

U.S. PATENT DOCUMENTS

| | | | |
|---|---|---|---|
| 6,044,275 A * | 3/2000 | Boltz et al. | 455/466 |
| 7,272,382 B2 * | 9/2007 | Servi et al. | 455/411 |
| 7,373,383 B2 * | 5/2008 | Boss et al. | 709/206 |
| 7,634,544 B2 * | 12/2009 | Kramer et al. | 709/206 |
| 8,645,470 B2 * | 2/2014 | Trossen | H04W 4/12 709/206 |
| 2002/0177449 A1 | 11/2002 | McDonnell et al. | |
| 2006/0291629 A1 * | 12/2006 | Esh et al. | 379/67.1 |
| 2008/0182598 A1 * | 7/2008 | Bowman | 455/466 |
| 2009/0150489 A1 * | 6/2009 | Davis et al. | 709/204 |
| 2009/0248694 A1 * | 10/2009 | Martinez | G06F 17/30404 |
| 2010/0049702 A1 * | 2/2010 | Martinez | H04L 12/58 707/769 |
| 2012/0270563 A1 | 10/2012 | Sayed | |
| 2012/0302258 A1 | 11/2012 | Pai et al. | |
| 2013/1111341 | 5/2013 | Bier et al. | |

OTHER PUBLICATIONS

•http://trapster.net/JotYou/how-it-works.php, downloaded Aug. 28, 2014.
•http://trapster.net/JotYou/presentation-highdef.php, downloaded Aug. 28, 2014.
Corresponding European Patent Application No. EP 15 17 9928 dated Nov. 9, 2015.

* cited by examiner

*Primary Examiner* — Mong-Thuy Tran
(74) *Attorney, Agent, or Firm* — Perry + Currier, Inc.

(57) ABSTRACT

A method, system and apparatus for location and time-based messaging using text-based tags is provided. A message and an address of a destination device is received at a processor of a device, the message comprising text for delivery to the destination device, the text comprising and a text-based tag in the text, the tag comprising one or more keywords associated with one or more of a location and a time to deliver the message to the destination device. The tag is processed, at the processor, to associate one or more of the location and the time with the message. The message is transmitted, using the communication interface, for delivery to the destination device using the address, at one or more of the location and the time.

18 Claims, 13 Drawing Sheets

| Monday August 11, 2014 | |
|---|---|
| TIME | Event |
| 09.00 | Breakfast Meeting |
| 10.00 | |
| 11.00 | Monthly Sales Meeting |
| 12.00 | |
| 13.00 | |
| 14.00 | |
| 15.00 | |
| 16.00 | |
| 17.00 | Weekly Squash Game |
| 18.00 | |

WORK | PERSONAL

METHOD, SYSTEM AND APPARATUS FOR LOCATION AND TIME-BASED MESSAGING USING TEXT-BASED TAGS

FIELD

The specification relates generally to mobile devices, and specifically to a method, system and apparatus for location and time-based messaging using text-based tags.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 3 depicts a calendar file, according to non-limiting implementations.

DETAILED DESCRIPTION

Figure 1:
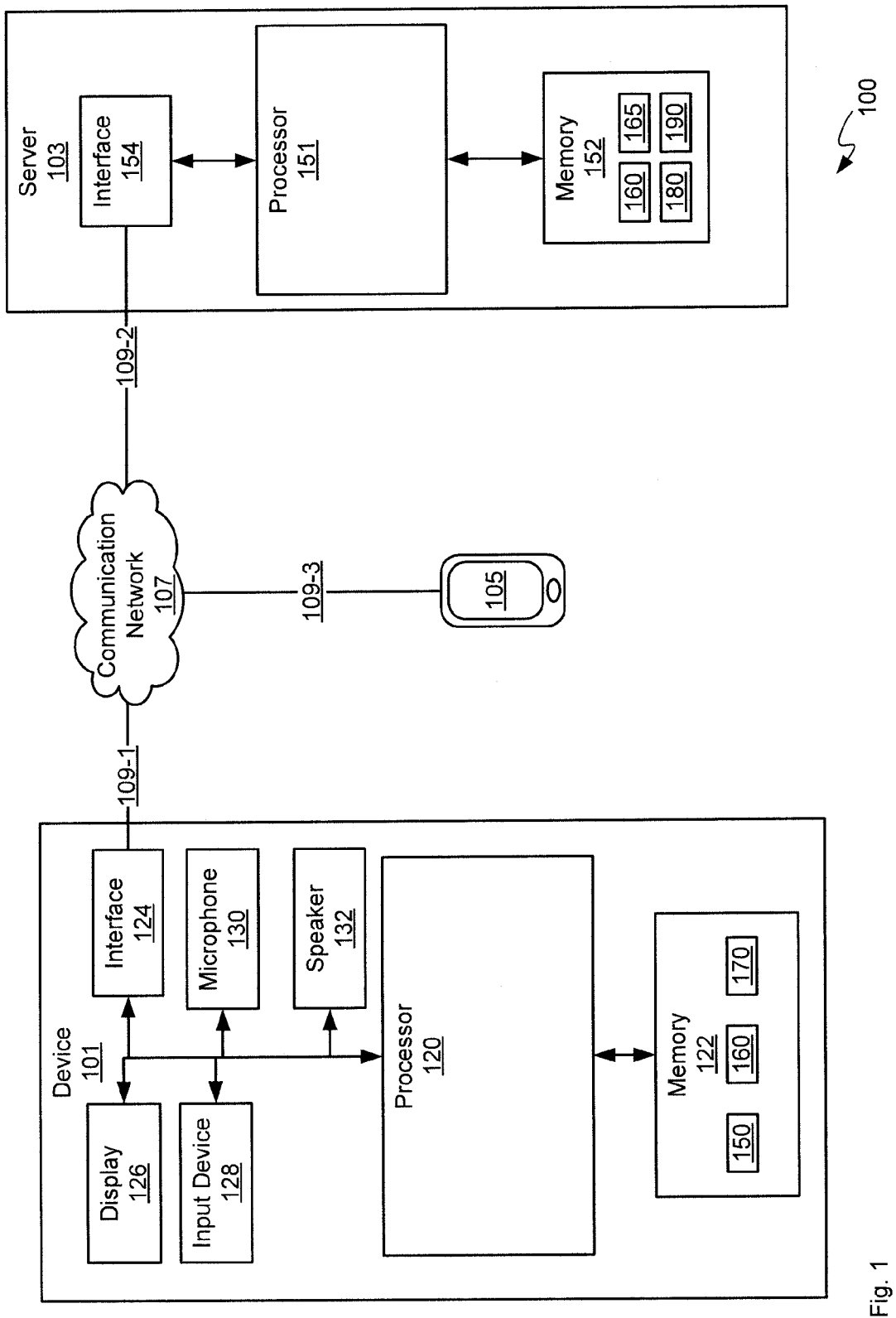
FIG. 1 depicts a system for location and time-based messaging using textual tags, according to non-limiting implementations.

In general, this disclosure is directed to a system for location-based messaging in which text messages include text-based tags that include keywords that can be associated with locations for delivery of a message and/or times for delivery of a message. The association can occur using a contact file, a calendar file and/or using a mapping application. The association can occur at a device originating the message and/or at a server that is to deliver the message. For example, location tagging can occur at the originating device and/or a server, and the time tagging can occur at the server, the server having access to a timetable associated with a destination device. The server then delivers the message to the destination device when the destination device is at the location specified in the tag and/or the server delivers the message to the destination device at the associated time.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a device comprising: a processor, a memory, a communication interface, the processor configured to: receive, at the processor, a message and an address of a destination device, the message comprising text for delivery to the destination device, the text comprising a text-based tag, the tag comprising one or more keywords associated with one or more of a location and a time to deliver the message to the destination device; process, at the processor, the tag to associate one or more of the location and the time with the message; and, transmit, using the communication interface, the message for delivery to the destination device using the address, at one or more of the location and the time.

The processor can be further configured to process the tag to associate one or more of the location and the time with the message by: extracting the one or more keywords from the tag; and, comparing the one or more keywords to one or more of a contact file associated with the address and a calendar file associated with the address to extract one or more of the location and the time from one or more of the contact file and the calendar file.

The processor can be further configured to process the tag to associate the location with the message by: extracting the one or more keywords from the tag; inputting the one or more keywords to a mapping application; and, receiving the location from the mapping application.

The processor can be further configured to: input one more words in the text to one or more of a contact file and a mapping application; and, populate the tag with a location from one or more of the contact file and the mapping application.

The processor can be further configured to transmit the message for delivery to the destination device using the address, at the location by: receiving current locations of the destination device; and, when the destination device is within a given distance from the location, transmit the message to the destination device.

The processor can be further configured to transmit the message for delivery to the destination device using the address, at the time by: determining a current time; and, when the time is about equal to the current time, transmitting the message to the destination device.

The tag can comprise a given textual character.

The one or more keywords can comprise respective text defining the location.

The one or more keywords can comprise respective text associated with a field of a contact file.

The one or more keywords can comprise respective text associated with a field of a calendar application.

Another aspect of the specification provides a method comprising: at a device comprising a processor, a memory, and a communication interface, receiving, at the processor, a message and an address of a destination device, the message comprising text for delivery to the destination device, the text comprising a text-based tag, the tag comprising one or more keywords associated with one or more of a location and a time to deliver the message to the destination device; processing, at the processor, the tag to associate one or more of the location and the time with the message; and, transmitting, using the communication interface, the message for delivery to the destination device using the address, at one or more of the location and the time.

Processing the tag to associate one or more of the location and the time with the message can comprise: extracting the one or more keywords from the tag; and, comparing the one or more keywords to one or more of a contact file associated with the address and a calendar file associated with the address to extract one or more of the location and the time from one or more of the contact file and the calendar file.

Processing the tag to associate the location with the message can comprise: extracting the one or more keywords from the tag; inputting the one or more keywords to a mapping application; and, receiving the location from the mapping application.

The method can further comprise: inputting one or more words in the text to one or more of a contact file and a mapping application; and, populating the tag with a location from one or more of the contact file and the mapping application.

Transmitting the message for delivery to the destination device using the address, at the location can comprise: receiving current locations of the destination device; and, when the destination device is within a given distance from the location, transmitting the message to the destination device.

Transmitting the message for delivery to the destination device using the address, at the time can comprise: determining a current time; and, when the time is about equal to the current time, transmitting the message to the destination device.

The tag can further comprise a given textual character.

The one or more keywords can comprise respective text defining the location.

The one or more keywords can comprise respective text associated with a field of a contact file.

The one or more keywords can comprise respective text associated with a field of a calendar application.

Yet a further aspect of the specification provides a computer program product, comprising a computer usable medium having a computer readable program code adapted to be executed to implement a method comprising: at a device comprising a processor, a memory, and a communication interface, receiving, at the processor, a message and an address of a destination device, the message comprising text for delivery to the destination device, the text comprising a text-based tag, the tag comprising one or more keywords associated with one or more of a location and a time to deliver the message to the destination device; processing, at the processor, the tag to associate one or more of the location and the time with the message; and, transmitting, using the communication interface, the message for delivery to the destination device using the address, at one or more of the location and the time. The computer usable medium can comprises a non-transitory computer usable medium.

FIG. 1 depicts a system 100 for location and time-based messaging using textual tags, system 100 comprising a device 101, a server 103, a device 105, in communication using at least one communication network 107 (interchangeably referred to hereafter as network 107), and respective links 109-1, 109-2, 109-3 (interchangeably referred to hereafter, collectively, as links 109, and generically as a link 109) thereto, according to non-limiting implementations. Device 101 comprises a processor 120 interconnected with a memory 122, a communications interface 124 (interchangeably referred to hereafter as interface 124), a display 126 and an input device 128, optionally a microphone 130 and speaker 132. Server 103 generally comprises a processor 151 interconnected with a memory 152 and a communication interface 154 (interchangeably referred to hereafter as interface 154). While not depicted, device 105 comprises a processor, a memory, a communication interface, a display, and optionally a microphone and a speaker. Furthermore, system 100 includes components for determining a current location of device 105 which can be determined and transmitted to one or more of server 103 and device 101. Hence, in some implementations, device 105 further comprises a location determining device, including but not limited to, a Global Positioning System (GPS) device; in yet further implementations, system 100 comprises components for determining a location of device 105 using triangulation techniques and the like.

As will be explained in detail below, one or more of device 101 and server 103 are configured to: receive a message and an address of a destination device, the message comprising text for delivery to the destination device, the text comprising a text-based tag, the tag comprising one or more keywords associated with one or more of a location and a time to deliver the message to the destination device; process the tag to associate one or more of the location and the time with the message; and, transmit the message for delivery to the destination device using the address, at one or more of the location and the time. While it is assumed herein that device 105 comprises a destination device, system 100 can comprise any number of destination devices, and indeed methods described herein can be applied for any number of destination devices.

Links 109 comprises any suitable links for enabling device 101, 105 and server 103 to communicate with network 107. Links 109 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth™ links, NFC (near field communication) links, WiFi links, WiMax links, packet based links, the Internet, analog networks, the PSTN (public switched telephone network), access points, and the like, and/or a combination.

Device 101 can be any type of electronic device that can be used in a self-contained manner. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

FIG. 1 further depicts a schematic diagram of device 101 according to non-limiting implementations. It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony and/or messaging, in other implementations, device 101 can comprise a device configured for implementing any suitable specialized functions, including but not limited to one or more of telephony, messaging, computing, appliance, and/or entertainment related functions.

Device 101 comprises at least one input device 128 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. In specific non-limiting implementations described herein, input device 128 comprises a touch screen for receiving touch input data.

Input from input device 128 is received at processor 120 (which can be implemented as a plurality of processors, including but not limited to one or more central processors (CPUs) and/or one or more processing units; either way, processor 120 comprises a hardware element of device 101). Processor 120 is configured to communicate with memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, memory 122 stores a messaging application 150 that, when processed by processor 120, enables processor 120 to: receive a message and an address of a destination device, the message comprising text for delivery to the destination device, the text comprising a text-based tag, the tag comprising one or more keywords associated with one or more of a location and a time to deliver the message to the destination device. In some implementations, processor 120 processing application 150 enables processor 120 to process the tag to associate one or more of the location and the time with the message. In yet further implementations, processor 120 processing application 150 enables processor 120 to transmit the message for delivery to the destination device using the address, at one or more of the location and the time. However, in other implementations described below, one or more of these functions can occur at server 103.

Furthermore, application 150 is an example of programming instructions stored at memory 122.

Figure 2:
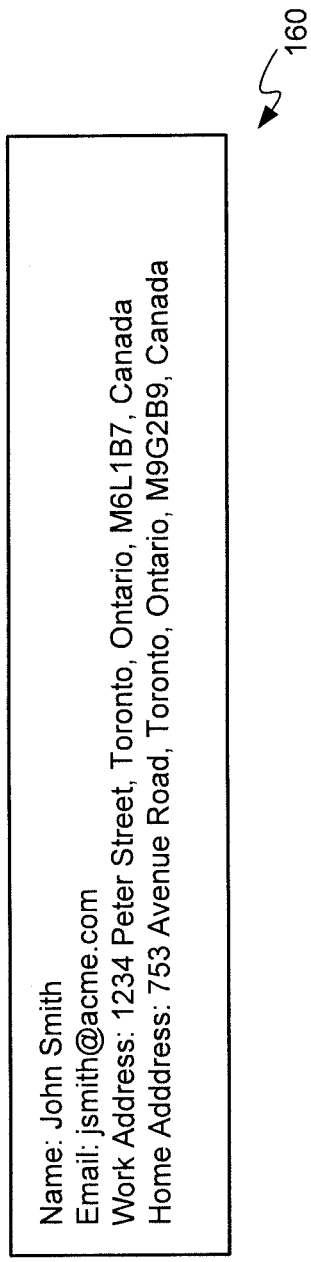
FIG. 2 depicts a contact file, according to non-limiting implementations.

In some implementations, memory 122 can further store one or more contact files, for example a contact file 160 associated with device 105. For example, with reference to FIG. 2, contact file 160 can store information associated with device 105 including, but not limited to, a name of a user of device 105, one or more network addresses associated with device 105, including but not limited to an email address, a geographical work address of a user of device 105, and a geographical home address of a user of device 105. Other contact information can be stored in contact file 160. Further, while FIG. 2 depicts a particular format of contact file 160, contact file 160 can have any suitable format, including, but not limited to, a database format, and the like.

Returning to FIG. 1, in some implementations, memory 122 can further store a mapping application 170 configured to determine a geographic location from a keywords; while described in further detail below, mapping location 170 can, for example, receive a key word, such as the name of a coffee shop, and the like, and return a geographic location of the coffee shop by querying a mapping server (not depicted), and the like.

Processor 120 can also be configured to communicate with a display 126, and optionally a microphone 130 and a speaker 132. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, display 126 and input device 128 are combined into one apparatus. Microphone 130, when present, comprises any suitable microphone for receiving sound data. Speaker 132, when present, comprises any suitable speaker for providing sound data, audible alerts, audible communications from remote communication devices, and the like, at device 101.

In some implementations, input device 128 and display 126 are external to device 101, with processor 120 in communication with each of input device 128 and display 126 via a suitable connection and/or link.

Processor 120 also connects to interface 124, which can be implemented as one or more radios and/or connectors and/or network adaptors, configured to communicate with network 107 via link 109-1. In general, interface 124 is configured to correspond with the network architecture that is used to implement link 109-1, as described above. In other implementations a plurality of links with different protocols can be employed and thus interface 124 can comprise a plurality of interfaces to support each link.

In any event, any suitable combination of interfaces is within the scope of present implementations.

While not depicted, device 101 can comprise a time device including but not limited to a clock device, a clock at processor 120, a software-based clock and the like. Regardless of a configuration of the time device, the time device can be used by processor 120 to determine a current time.

While not depicted, device 101 further comprises a power source, for example a connection to a battery, a power pack and the like and/or a connection to a main power supply and a power adaptor (e.g. and AC-to-DC (alternating current to direct current) adaptor, and the like), which can be used to power device 101 and/or charge a battery and the like.

Further, it should be understood that in general a wide variety of configurations for device 101 are contemplated.

FIG. 1 further depicts a schematic diagram of server 103. Server 103 generally comprises a server configured to convey messages between devices 101, 105, as will be described in more detail below. Server 103 can be based on any well-known server environment including a module that houses one or more central processing units, volatile memory (e.g. random access memory), persistent memory (e.g. hard disk devices) and network interfaces to allow server 103 to communicate over link 109-2. For example, server 103 can be a Sun Fire V480 running a UNIX operating system, from Sun Microsystems, Inc. of Palo Alto Calif., and having four central processing units (including but not limited to processor 151) each operating at about nine-hundred megahertz and having about sixteen gigabytes of random access memory (including but not limited to memory 152, which can comprise any suitable combination of volatile and non-volatile memory). However, it is to be emphasized that this particular server is merely exemplary, and a vast array of other types of computing environments for server 103 are contemplated. For example, server 103 can comprise any suitable number of servers that can perform different functionality of server implementations described herein.

Interface 154 can be implemented as one or more radios and/or connectors and/or network adaptors, configured to communicate with network 107 via link 109-2. In general, interface 154 is configured to correspond with the network architecture that is used to implement link 109-2, as described below. In other implementations a plurality of links with different protocols can be employed and thus interface 154 can comprise a plurality of interfaces to support each link.

In some implementations, as depicted, memory 152 stores a copy of contact file 160, a calendar file 165 associated with device 105, an application 180 and a mapping application 190. Calendar file 165 comprises a schedule associated with device 105. For example, with reference to FIG. 3, calendar file 165 can include a schedule of events for one or more days, where times where events are not scheduled are defined as free time and/or times outside of work times are defined as personal times. Furthermore, calendar file 165 can include a definition of work hours and non-work hours; for example time from 09.00 to 17.00 Monday to Friday can be defined as work time, while other time can be defined as non-work time and/or personal time. However, while FIG. 3 depicts a given format for calendar file 165, calendar file 165 can have any format, including, but not limited to a database format.

While not depicted, server 103 can comprise a time device including but not limited to a clock device, a clock at processor 151, a software-based clock and the like. Regardless of a configuration of the time device, the time device can be used by processor 120 to determine a current time.

While also not depicted, in some implementations, device 101 can be one or more of access calendar file 165 at server 103 by querying server 103 for data in calendar file 165 over network 107 and links 109, and store a copy of calendar file 165.

Returning to FIG. 1, memory 152 further stores a messaging application 180 that, when processed by processor 151, enables processor 151 to: receive a message and an address of a destination device, the message comprising text for delivery to the destination device, the text comprising a text-based tag, the tag comprising one or more keywords associated with one or more of a location and a time to deliver the message to the destination device; process the tag to associate one or more of the location and the time with the message; and transmit the message for delivery to the destination device using the address, at one or more of the location and the time. However, in other implementations, one or more of these functions can occur at device 101.

Furthermore, application 180 is an example of programming instructions stored at memory 152.

In some implementations, memory 152 can further store a mapping application 190 configured to determine a geographic location from a keyword; while described in further detail below, mapping application 190 can, for example, receive a key word, such as the name of a coffee shop, and the like, and return a geographic location of the coffee shop by querying a mapping server (not depicted), and the like. In other words, mapping application 190 can be similar to mapping application 170.

Device 105 can be any type of portable electronic device that can be used in a self-contained manner. Device 105 includes, but is not limited to, any suitable combination of electronic devices, communications devices, computing devices, personal computers, laptop computers, portable electronic devices, mobile computing devices, portable computing devices, tablet computing devices, laptop computing devices, telephones, PDAs (personal digital assistants), cellphones, smartphones, e-readers, internet-enabled portable appliances and the like. Other suitable devices are within the scope of present implementations. While a schematic diagram of device 105 is not depicted, device 105 can be schematically similar to device 101, though device 105 is generally portable and/or can be transported from place to place and/or can be configured to be held and/or carried by a human hand and/or is transportable in a pocket and/or bag of a user. Further, as described above, system 100 includes components for determining a location of device 105, including, but not limited to a GPS device at device 105, components for determining a location of device 105 using triangulation techniques and the like.

Figure 4:
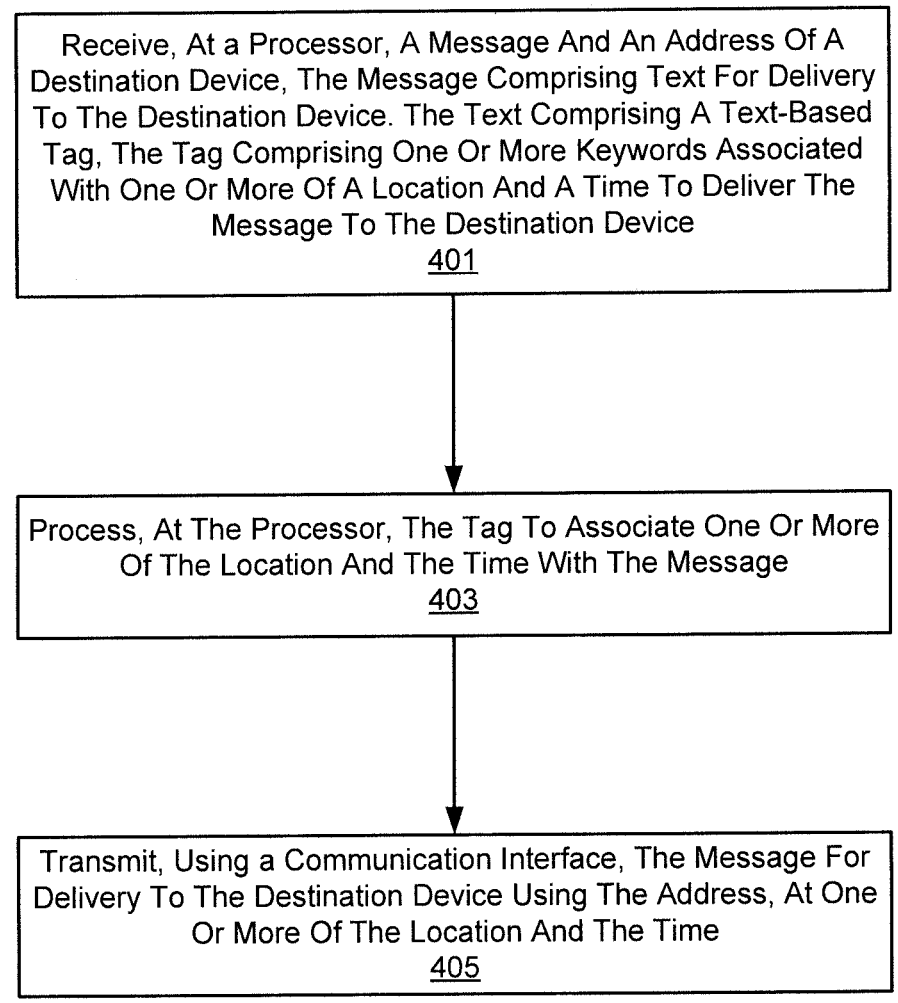
FIG. 4 depicts a method for location and time-based messaging using textual tags, according to non-limiting implementations.
Figure 5:
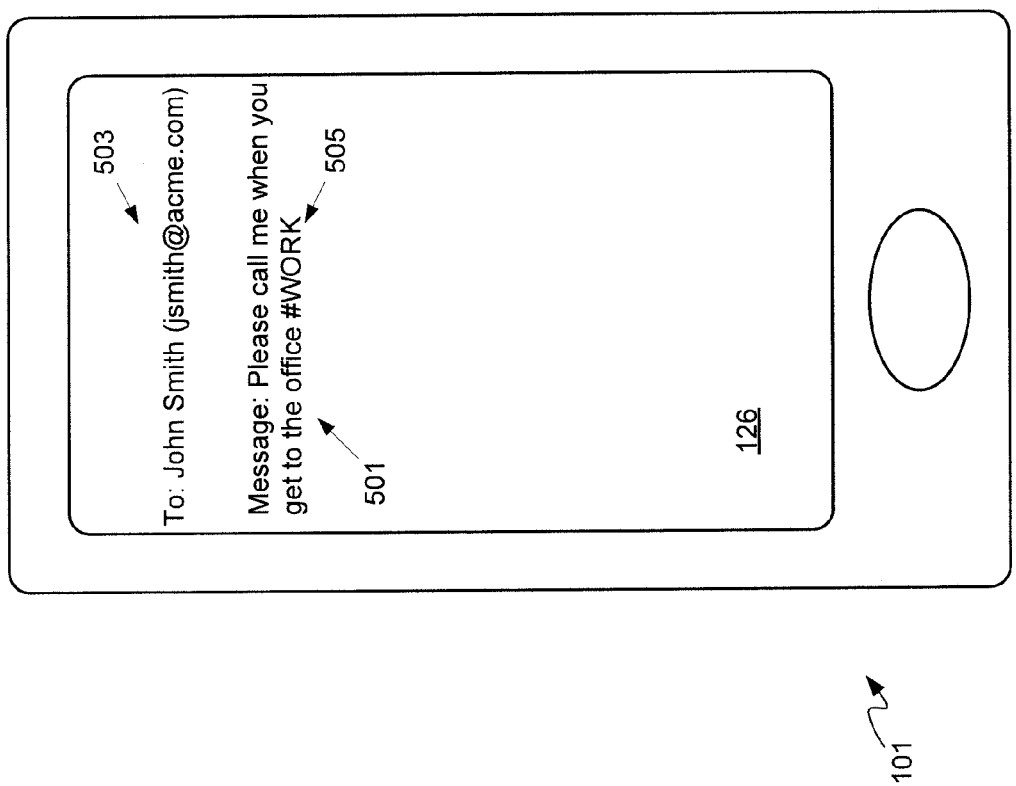
FIG. 5 depicts a graphic user interface for generating a location-based message with a textual tag associated with a contact file, according to non-limiting implementations.

Attention is now directed to FIG. 4 which depicts a flowchart of a method 400 for location and time-based messaging using textual tags, according to non-limiting implementations. In order to assist in the explanation of method 400, it will be assumed that method 400 is performed using system 100. Furthermore, the following discussion of method 400 will lead to a further understanding of system 100 and its various components. However, it is to be understood that system 100 and/or method 400 can be varied, and need not work exactly as discussed herein in conjunction with each other, and that such variations are within the scope of present implementations.

In some implementations, method 400 is implemented in system 100 by processor 120 of device 101. Indeed, method 400 is one way in which device 101 can be configured. However, in other implementations, method 400 is implemented in system 100 by processor 151 of server 103, and method 400 can be one way in which server 103 is configured. In yet further implementations, method can be implemented in system 100 by a combination of processor 120 and processor 151.

Regardless, it is to be emphasized, that method 400 need not be performed in the exact sequence as shown, unless otherwise indicated; and likewise various blocks may be performed in parallel rather than in sequence; hence the elements of method 400 are referred to herein as "blocks" rather than "steps". It is also to be understood, however, that method 400 can be implemented on variations of system 100 as well.

At block 401, one or more processors 120, 151 receives a message and an address of a destination device, the message comprising text for delivery to the destination device, the text comprising a text-based tag, the tag comprising one or more keywords associated with one or more of a location and a time to deliver the message to the destination device.

At block 403, one or more processors 120, 151 processes the tag to associate one or more of the location and the time with the message.

At block 405, one or more processors 120, 151 transmits the message for delivery to the destination device using the address, at one or more of the location and the time.

Method 400 will now be discussed in more detail with reference to FIGS. 5 to 13, with FIGS. 6, 7 and 9 being substantially similar to FIG. 1, with like elements having like numbers.

For example, consider a scenario in which method 400 is being implemented at device 101, and text message is being generated thereat, and specifically, a user of device 101 wishes to send a message to device 105, but only when device 105 is at or near the work address in contact file 160. Attention is next directed to FIG. 5, which depicts a perspective view of a non-limiting implementation of device 101 with a message 501 being generated at display 126 in a graphic user interface (GUI). While not depicted, it is assumed that message 501 is received using input device 128 (e.g. block 401 of method 400), including, but not limited to, a virtual keyboard. Message 501 is received with an address 503 of device 105 (e.g. jsmith@acme.com and/or an alias thereof, e.g. "John Smith"), and text of message 501 includes text and text-based tag 505 (e.g. "#WORK") comprising one or more keywords (e.g. WORK) associated with a location to deliver message to destination device 105.

While address 503 is depicted as an email address and/or an alias thereof, an address within the present specification can include, but is not limited to, a network address, an email address, a telephone number, a mobile telephone number, a PIN (personal identification number), a MAC (media access control) address and the like.

Furthermore, while message 501 includes text "Please call me when get to work", in addition to tag 505, in other implementations, messages within the present specification can include, but is not limited to, an image file and/or image content, a video file and/or video content, an audio file and/or audio content, a multimedia and/or multimedia content, and the like. Indeed, in some implementations a message within the present specification can be absent of text, other than a text-based tag, but include multimedia content and the like. In yet further implementations, messages within the present specification can be blank, other than the text-based tag; for example, a message comprising text can comprise only the text-based tag.

Figure 6:
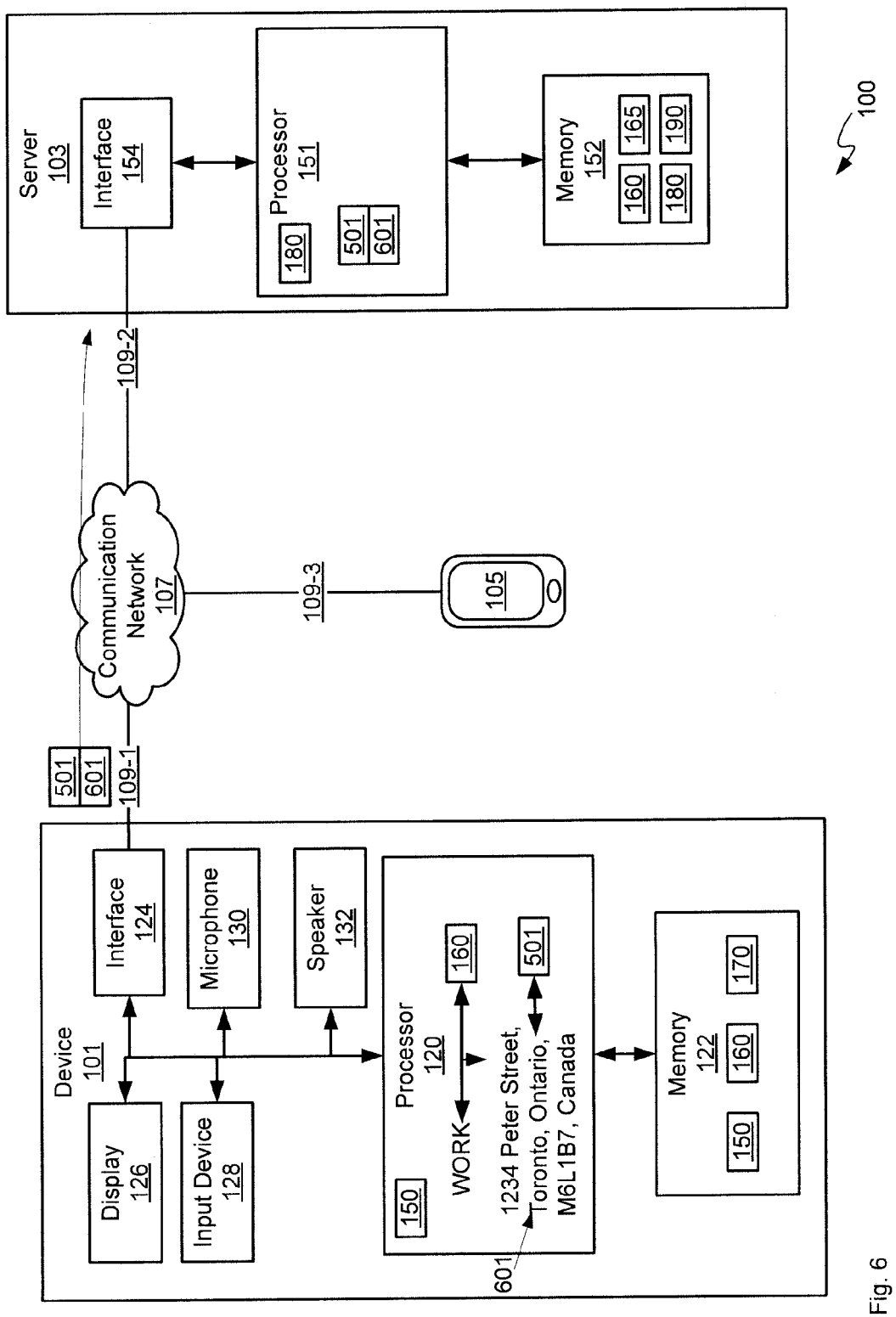
FIG. 6 depicts the system of FIG. 1 in which a textual tag is associated with a location from a contact file, according to non-limiting implementations.
Figure 7:
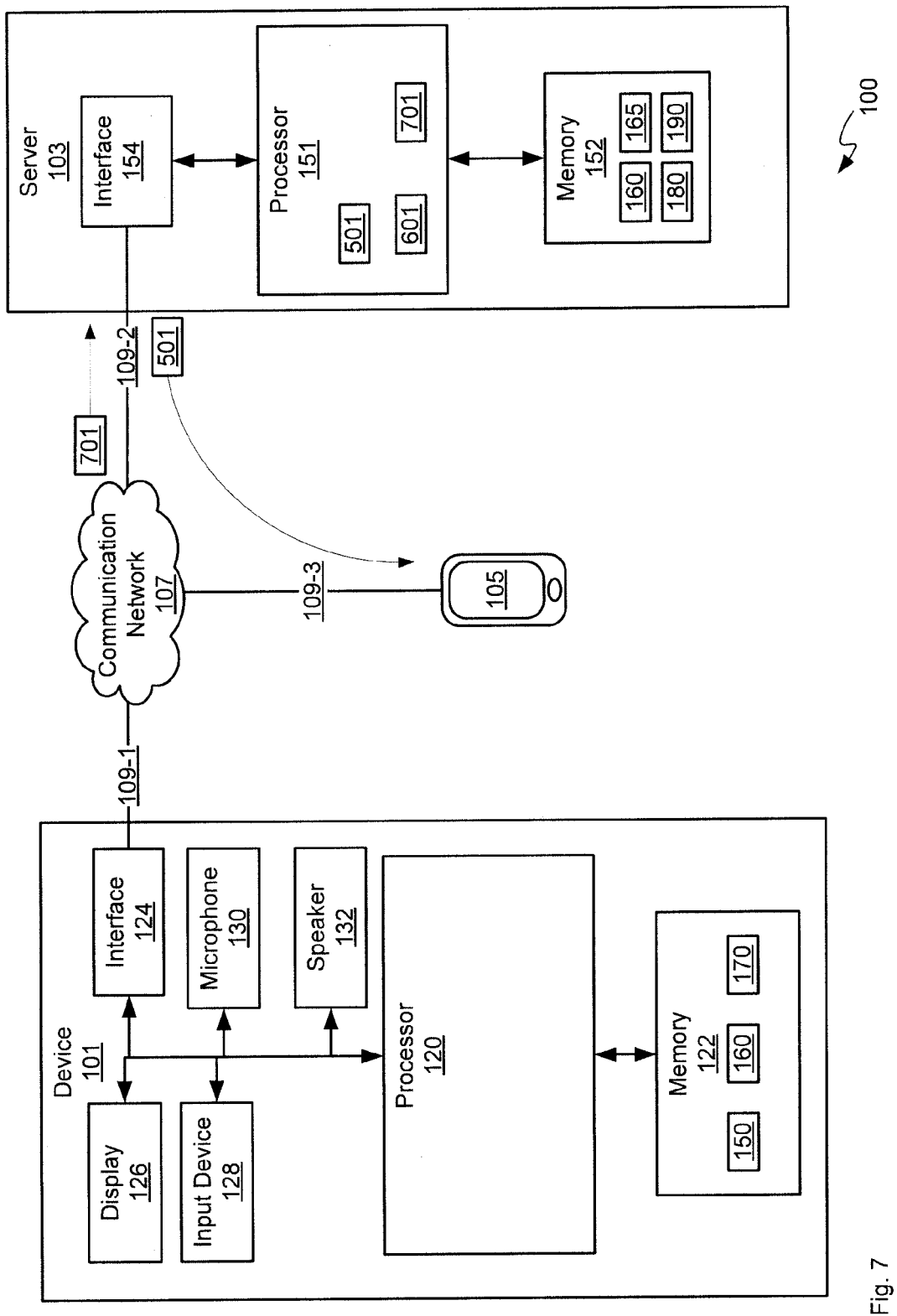
FIG. 7 depicts the system of FIG. 1 in which a location-based message is delivered to a destination device, according to non-limiting implementations.
Figure 8:
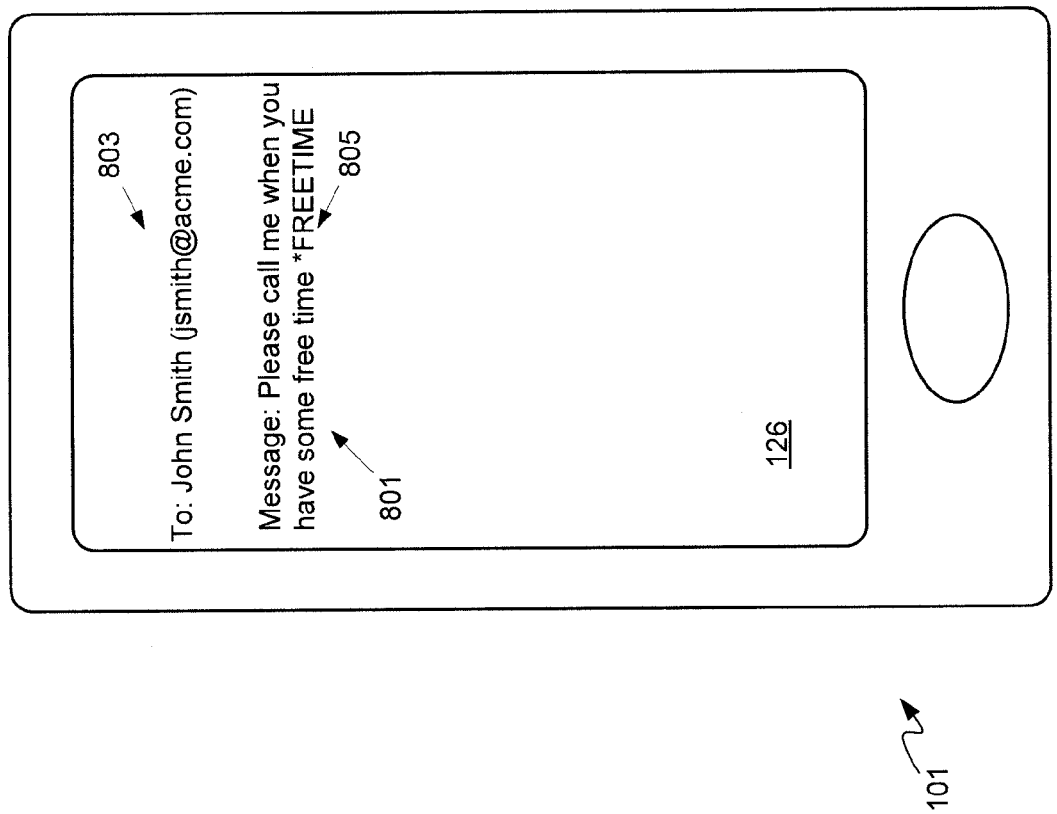
FIG. 8 depicts a graphic user interface for generating a time-based message with a textual tag associated with a calendar file, according to non-limiting implementations.

With reference to FIG. 6, device 101 is processing application 150, and processor 120 extracts the one or more keywords from tag 505, and, compares the one or more keywords to contact file 160 associated with the address 503 to extract a location 601 from contact file 160. Specifically, as tag 505 includes the keyword "WORK" which is the same as an identifier of an address stored in contact file 160 (e.g. "Work", ignoring the term "address"), a location 601 associated with the "Work" address is extracted from contact file 160, and associated with message 501 (e.g. block 403 of method 400). Message 501 and location 601 are then transmitted to server 103 (e.g. block 405 of method 400), which acts as an intermediary between devices 101, 105. While not depicted, message 501 is transmitted to server 103 with address 503. Furthermore, location 601 can be transmitted as metadata of message 501 and/or location 601 can be added as text to tag 505.

Alternatively, message 501 can be transmitted to server 103 without device 101 extracting location 601 from contact file 160, and processor 151 can extract location 601 from the copy of contact file 160 stored at memory 152 when processor 151 is processing application 180.

Either way, server 103 does not immediately transmit message 501 to device 105. Rather, with reference to FIG. 7, processor 151 processes application 180 and server 103 receives current locations 701 of (destination) device 105; and, when destination device 105 is within a given distance from location 601, server 103 transmits message 1 to the destination device 105 using address 503 (e.g. an alternative implementation of block 405 of method 400).

In some implementations, device 105 can transmit locations 701 to server 103 by using a GPS at device 105 to determine locations of device 105. In other implementations, components of network 107 can use triangulation techniques to determine locations of device 105. In some of these implementations, server 103 can request locations 701, while in other implementations locations 701 can be pushed to server 103 by device 105 and/or by components of network 107.

Either way, when location 601 is about equal to a location 701, message 501 is transmitted from server 103 to device 105. For example, while not depicted, it is assumed in system 100 that device 105 is portable and is being transported around a geographical area; hence, message 501 is not transmitted to device 105 until device 105 is at or near location 601. Hence, using the example shown in FIG. 5, the message "Please call me when you get to the office" is not transmitted to device 105 until device 105 is at a work address in contact file 160.

Location 601 need not be exactly equal to a location 701, but location 601 can be within a given distance from location 701. Such geofencing boundaries can be provisioned using one or more of device 101 and server 103 in a provisioning step. Alternatively, such boundaries can be set using tag 505: for example, tag 505 can be modified to "#WORK1 km", so that message 501 is delivered when device 105 is within 1 km of a location associated with the keyword "WORK" in contact file 160.

While not depicted, mapping applications 170, 190 can be used to define locations 601, 701, for example by converting an address to map coordinates and/or vice versa. In other words, locations 701 can be received as longitude/latitude coordinates while location 601 can be a postal address; hence mapping locations 170, 190 can be used to convert locations 601, 701 to a similar format.

Next, consider a scenario in which method 400 is being implemented at server 103, and a text message is being generated at device 101: specifically, a user of device 101 wishes to send a message to device 105, but only when a user of device 105 has free time. Attention is next directed to FIG. 8, which depicts a perspective view of a non-limiting implementation of device 101 with a message 801 being generated at display 126. While not depicted, it is assumed that message 801 is received using input device 128, including, but not limited to, a virtual keyboard. Message 801 is received with an address 803 of device 105 (e.g. jsmith@acme.com and/or an alias thereof, e.g. "John Smith"), and text of message 801 includes text and text-based tag 805 (e.g. "FREETIME") comprising one or more keywords (e.g. FREETIME) associated with a time that message is to be delivered to destination device 105.

Figure 9:
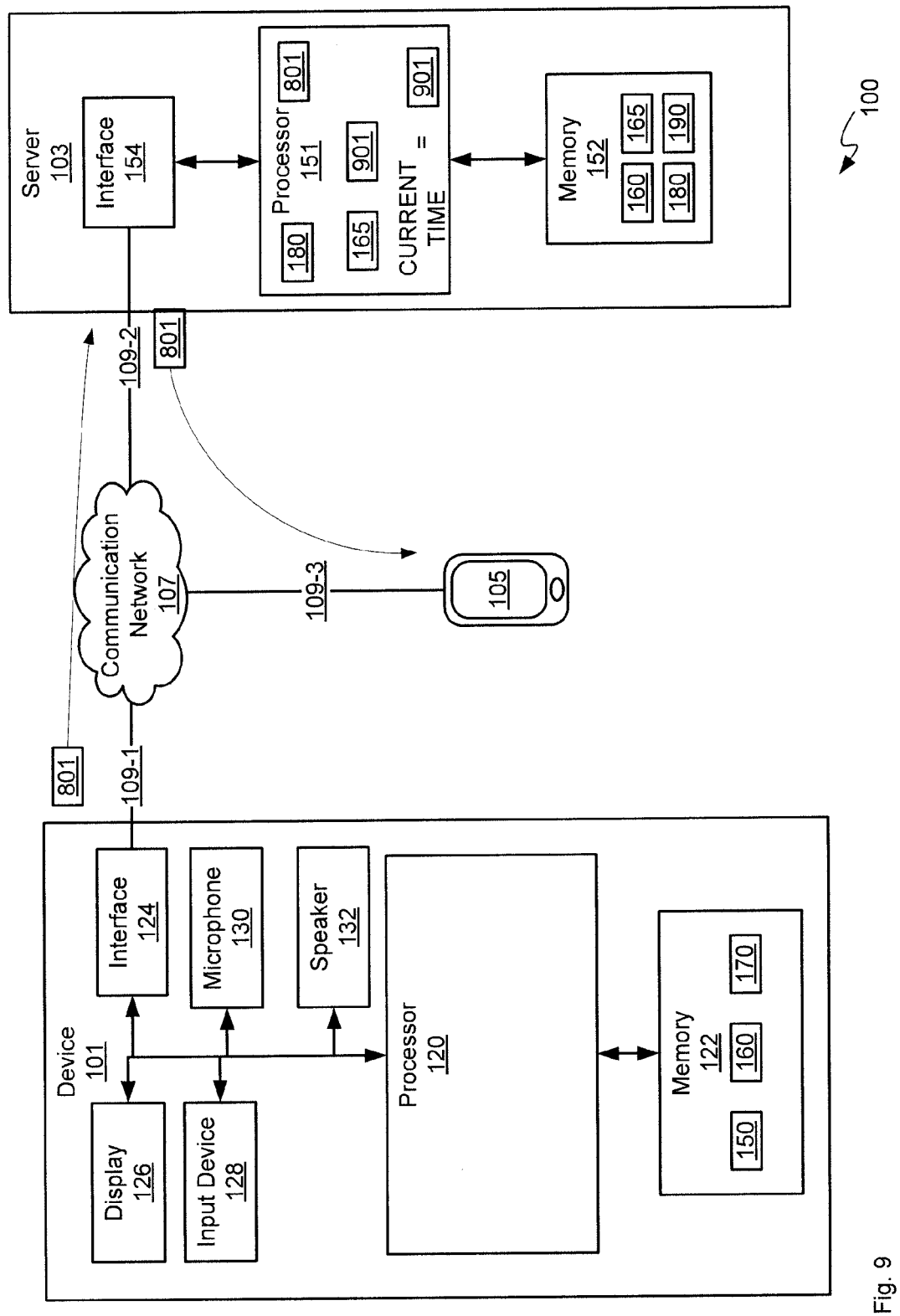
FIG. 9 depicts the system of FIG. 1 in which a time-based message is delivered to a destination device, according to non-limiting implementations.

With reference to FIG. 9, device 101 transmits message 801 to server 103, receives message 801 with address 803 (e.g. block 401 of method 400), which is processing application 180 at processor 151, and processor 151 extracts the one or more keywords from tag 805, and, compares the one or more keywords to calendar file 165 extract a time 901 from calendar file 165 (e.g. block 403 of method 400). Specifically, as tag 805 includes the keyword "FREETIME", processor 151 processes calendar file 165 to extract a time that next instance of free time occurs in calendar file 165. It is hence assumed that processor 151 can determine a current time, and process calendar file 165 to determine free time and specifically when free time next occurs. Presuming that message 801 is received at server 103 around 12.30 on Monday Aug. 11, 2014, with reference to FIG. 3, processor 151 can determine that a next instance of free time in calendar file 165 occurs at 14.00 on Monday Aug. 11, 2014, as an event that is occurring at 12.30 ends at 14.00.

Hence, server 103 does not immediately transmit message 801 to device 105 (unless message 801 is received at a time designated as free in calendar file). Rather, server 103 waits until a current time is about equal to a time designated as free time in calendar file 165 and transmits message 801 at that time (e.g. block 405 of method 400).

In alternative implementations, a time that message 801 is to be transmitted to device 105 can be determined at device 101, presuming device 101 has access to calendar file 165 and/or stores a copy of calendar file 165.

Next, consider a scenario in which method 400 is being implemented at device 101, and a text message is to be delivered to device 105 but only when device 105 is at an address that is not located at contact file 160. Attention is next directed to FIG. 10, which depicts a perspective view of a non-limiting implementation of device 101 with a message 1001 being generated at display 126. While not depicted, it is assumed that message 1001 is received using input device 128 (e.g. block 401 of method 400), including, but not limited to, a virtual keyboard. Message 1001 is received with an address 1003 of device 105 (e.g. jsmith@acme.com and/or an alias thereof, e.g. "John Smith"), and text of message 1001 includes text and text-based tag 1005 (e.g. "#215spadinaavetorontoontario") comprising one or more keywords (e.g. 215spadinaavetorontoontario) associated with a location to deliver message to destination device 105.

In other words, tag 1005 can comprise a postal address, and the like, and device 101 can extract a location from tag 1005. Method 400 then proceeds as described above with reference to FIGS. 6 and 7.

Next, consider a scenario in which method 400 is being implemented at device 101, and a text message is to be delivered to device 105 but only when device 105 is at an address that is not located at contact file 160, and a user of device 101 knows a name of a location but not a postal address. Attention is next directed to FIG. 11, which depicts a perspective view of a non-limiting implementation of device 101 with a message 1101 being generated at display 126. While not depicted, it is assumed that message 1101 is received using input device 128 (e.g. block 401 of method 400), including, but not limited to, a virtual keyboard. Message 1101 is received with an address 1103 of device 105 (e.g. jsmith@acme.com and/or an alias thereof, e.g. "John Smith"), and text of message 1101 includes text that includes a name of a location (e.g. "Dark Horse", a name of a coffee shop); processor 120 inputs one or more words of text into mapping location 170 to determine if any words of text of message 1101 comprises one or more keywords that could represent a text-based location tag. As depicted, the keywords "Dark Horse" can be associated with a postal address "215 Spadina Ave, Toronto, Ontario" which can be retrieved from mapping location 170 using keywords "Dark Horse", and provided in a pop-up 1107, and/or the like, for acceptance using a virtual button, for example "YES" as depicted. Presuming the postal address is accepted, processor 120 populates tag 1105 with the location from mapping application 170; such population can be provided at display 126 (e.g. the address is added to key words "Dark Horse") or not provided (e.g. the address is not added to key words "Dark Horse", but populated as metadata to message 1101).

Method 400 then proceeds as described above with reference to FIGS. 6 and 7.

Alternatively, the address could be extracted from a contact file similar to contact file 160, for example a contact file associated with "Dark Horse" that includes an address. When the contact file includes more than one address, pop-up 1107 can include an option to select one or more of the addresses.

In yet a further alternative, pop-up 1107 can be optional and population of tag 1105 can occur automatically. For example, device 101 can be configured to recognize other keywords in message 1101, such as "Can you call me when", which can cause device 101 to automatically populate a location-based tag 1105 when an address associated with keywords is found using a mapping application and/or a contact file. In such implementations of method 400, method 400 can alternatively be performed, at least in part, by server 103.

Hence, one or more of processors 120, 151 can be further configured to process a tag to associate a location with the message by: extracting the one or more keywords from the tag; inputting the one or more keywords to a mapping application; and, receiving the location from the mapping application.

Alternatively, one or more of processors 120, 151 can be further configured to: input one more words in the text of a message to one or more of a contact file and a mapping application; and, populate the tag with a location from one or more of the contact file and the mapping application.

Next, consider a scenario in which method 400 is being implemented at server 103 and a text message is to be delivered to device 105 but only when a user of device 105 has free time, and a user of device 101 does not explicitly tag the text message but includes one or more time-based keywords. Attention is next directed to FIG. 12, which depicts a perspective view of a non-limiting implementation of device 101 with a message 1201 being generated at display 126. While not depicted, it is assumed that message 1201 is received using input device 128 (e.g. block 401 of method 400), including, but not limited to, a virtual keyboard. Message 1201 is received with an address 1203 of device 105 (e.g. jsmith@acme.com and/or an alias thereof, e.g. "John Smith"), and text of message 1201 includes text that comprises time-based keywords "free time". Message 1201 is transmitted to server 103, similar to FIG. 9, and server 103 extracts time-based keywords from message 1201 and compares the time-based key words to calendar file 165 to extract a next free time from calendar file 165. Tag 1205 is hence populated automatically at server 103 using calendar file 165.

Present implementations, further include various formats for tags and/or keywords. For example, in some implementations, a tag can comprise a given textual character, including, but not limited to, a hash character "#", as in FIGS. 5 and 10, an asterisk "*", as in FIG. 8, and the like. Such given textual characters can comprise an indicator of a location-based tag and/or a time-based tag, and the like.

Figure 10:
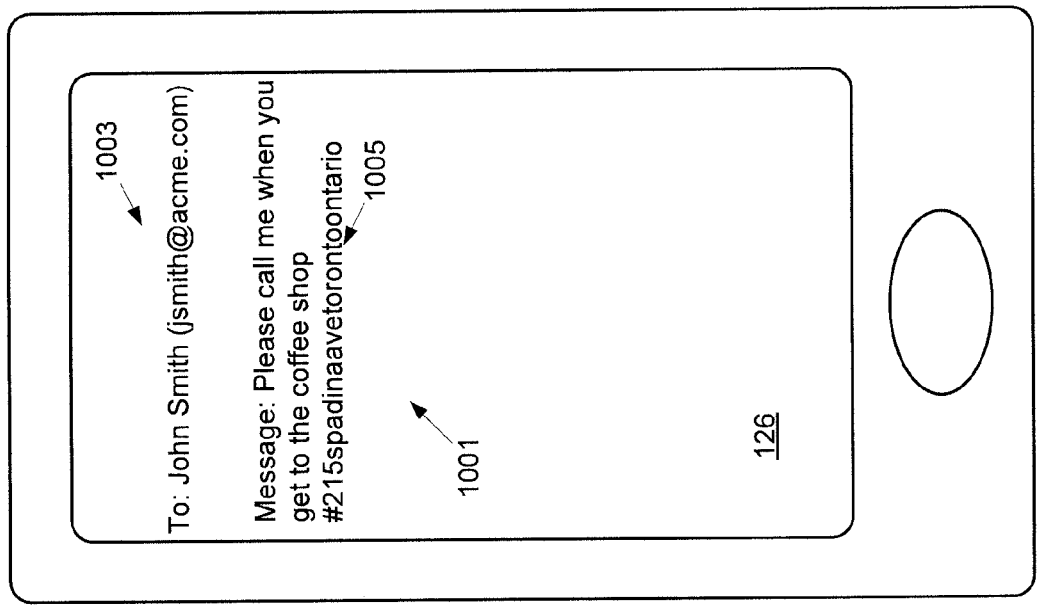
FIG. 10 depicts a graphic user interface for generating a location-based message with a textual tag that includes a postal address, according to non-limiting implementations.
Figure 11:
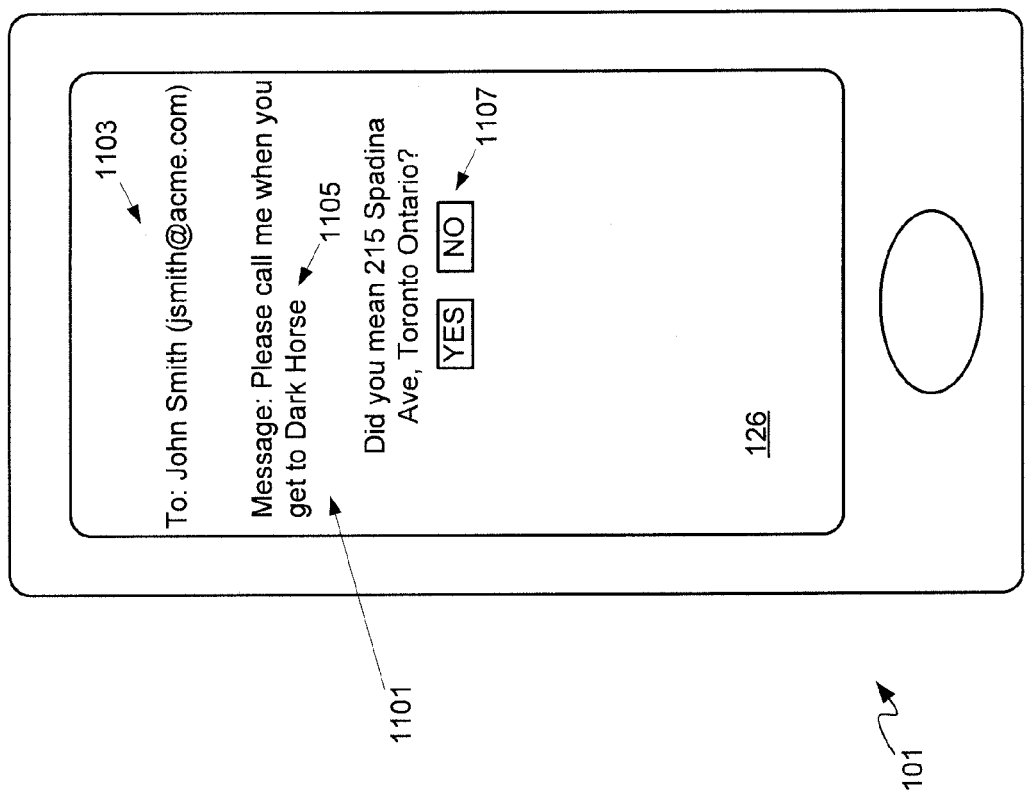
FIG. 11 depicts a graphic user interface for generating a location-based message with a textual tag that includes one or more keywords that can be associated with a location, according to non-limiting implementations.
Figure 12:
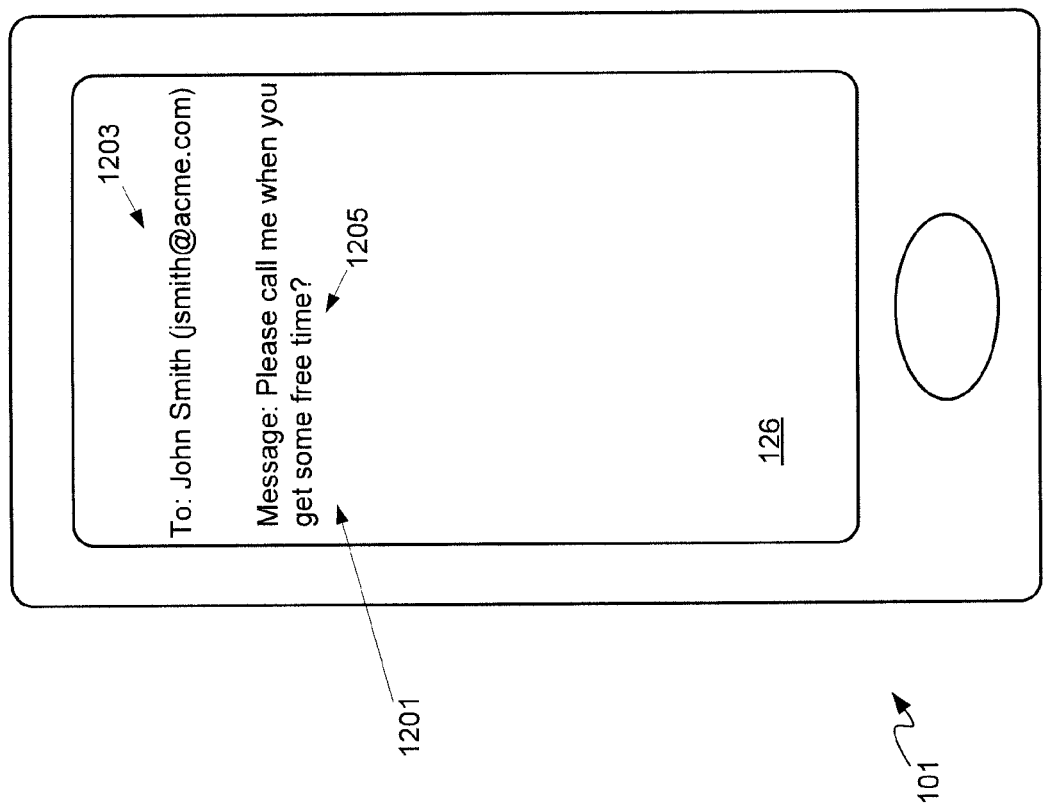
FIG. 12 depicts a graphic user interface for generating a time-based message with a textual tag that includes a key word that can be associated with a calendar file, according to non-limiting implementations.
Figure 13:
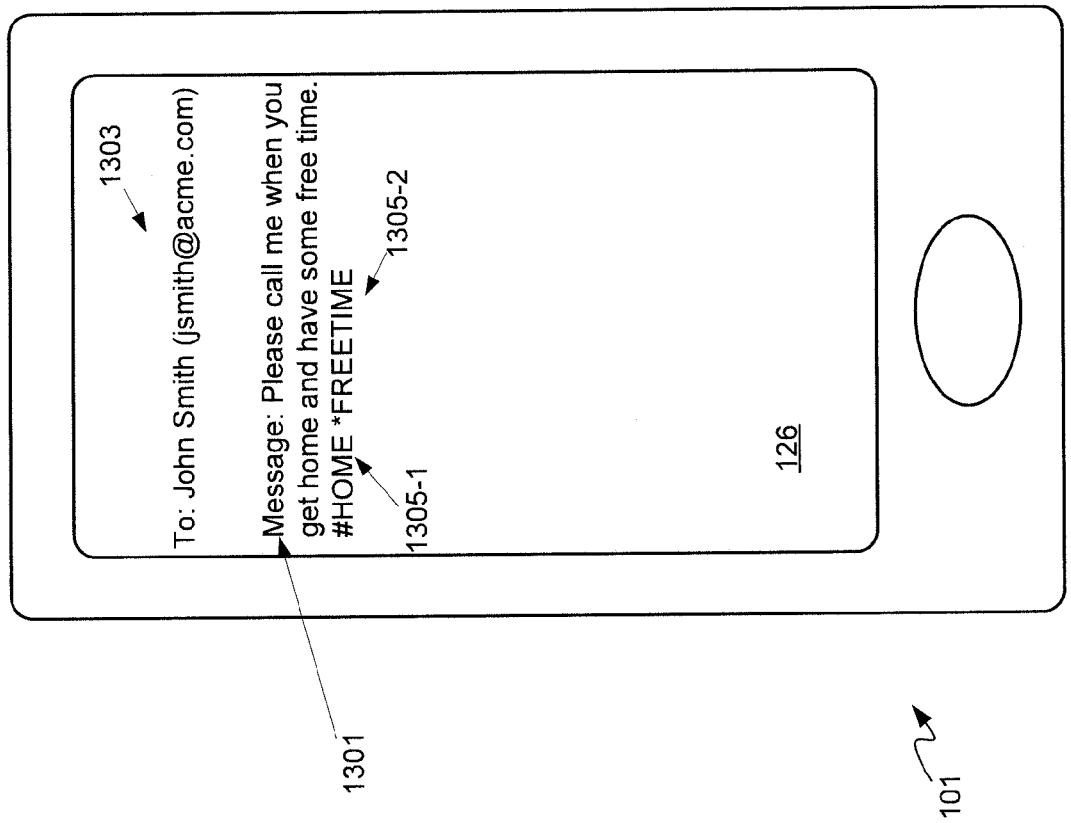
FIG. 13 depicts a graphic user interface for generating a location-based and time-based message with a textual tag associated with a contact file and another textual tag associated with a calendar file, according to non-limiting implementations.

In some implementations, as in FIGS. 10, and 11, one or more keywords of a tag can comprise respective text defining a location and/or a time. In further implementations, as in FIG. 5, one or more keywords can comprise respective text associated with a field of a contact file. In yet further implementations, as in FIGS. 8 and 12, one or more keywords can comprise respective text associated with a field of a calendar application.

Furthermore, location-based tags and time-based tags can be combined in a message. For example, attention is next directed to FIG. 13, which depicts a perspective view of a non-limiting implementation of device 101 with a message 1301 being generated at display 126. While not depicted, it is assumed that message 1301 is received using input device 128 (e.g. block 401 of method 400), including, but not limited to, a virtual keyboard. Message 1301 is received with an address 1303 of device 105 (e.g. jsmith@acme.com and/or an alias thereof, e.g. "John Smith"), and text of message 1301 includes a location-based tag 1305-1, similar to tag 505, and a time-base tag 1305-2, similar to tag 805. Method 400 is hence implemented as in FIGS. 6 and 7, and as in FIG. 9 so that device 101 associates a home address in contact file 160 with tag 1305-1, and transmits message to server 103, which determines free time associated with device 105. Server 103 transmits message 1301 to device 105 when device 105 is at or near an address associated with tag 1305-1, and at a time associated with tag 1305-2.

Persons skilled in the art will appreciate that there are yet more alternative implementations and modifications possible. For example, a message can be tagged with more than one location-based tag and/or more than one time-based tag, the message delivered when a destination device is at or near one of the locations specified in the location-based tags and/or at a time specified in the time-based tags; however, the message is transmitted to the destination device once, i.e. a first time conditions specified in the tags are met. In other words, when message is tagged with two location-based tags indicating two different locations, the message is transmitted the first time the destination device is at and/or near one of the two locations, but when the destination device is at or near the other of the two locations, after the message was first sent, the message is not resent.

In yet further implementations, messages described herein can expire. For example, if conditions specified in tags of a message described herein are not met within a given time period, the message is not delivered. The expiry time period can also be specified in a tag (for example, "*EXPIRESIN2hrs" to tag a message that should only be delivered within 2 hours of transmitting from device 101) and/or in a provisioning step at device 101 and/or server 103.

While messages herein have been described as text messages, method 400 can be applied to email, SMS (short message service) messages, MMS (Multimedia messaging service) messages, and the like.

In yet further implementations given tags can be associated with given locations and/or given times. For example, while tags described herein can be populated with data from fields from a contact file and/or a calendar file, in other implementations, tags can be populated with data from a data file defining associations between tags and locations and/or tags and times. For example, a tag "#LOCATION1" can be associated with an address "1234Peter Street, Toronto, Ontario, M6L1B7, Canada", a tag "LOCATION2" can be associated with an address "753 Avenue Road, Toronto, Ontario, M9G2B9, Canada", and a tag "TIME2" can be associated with a time "14.00" of a day a message is transmitted. Such associations can be stored in a data file dedicated to storing such associations and populated in one or more provisioning steps using a graphic user interface and the like.

In yet further implementations, in an exchange of message between devices 101, 105, one or more messages can be location-tagged and/or time-tagged and such messages delivered are delivered during the exchange of messages (i.e. without delay) and re-delivered when the conditions specified in the tags are met. For example, such an exchange can include a message "Let's keep talking but call me later when you arrive home in case we forget something in this email exchange. I'm tagging this message so it will be resent as a reminder #HOME"; this message can be transmitted from device 101 to device 105 when device 101 sends the message, and a copy stored at server 103. Further, the message is clearly one message in a message exchange between devices 101, 105. When device 105 is located at or near a location associated with the tag #HOME, server 103 again transmits the message to device 105 to remind a user of device 105 of the information in the message.

Various use cases of method 400 are now discussed.

In a first use case, a company sends a promotional mass message to devices registered to their members, the message location-tagged with one or more retail locations; once a member arrives at a location for a scheduled appointment, the message is pushed to their device. Furthermore, a server implementing method 400 can connect to an internal calendar of the company to access the scheduled appointment times and customize the tag to fit each recipient's appointment, within a time frame.

In a second use case, a company can hold a product release party and a tagged message can be sent to devices registered to subscriber-attendees welcoming them to the event, when they arrive at the event. In this use case, the messages can be tagged with the address of the location of the product release party. Once an attendee arrives at the product release party, they are pushed a welcome message. The messages can expire at end of the party so that if an invitee goes to the same location after the end of the party (e.g. the next day), the welcome message is not sent.

In a third use case, Dominik has been having trouble reaching Kay. Kay has been in meetings all day and hasn't read any of Dominik's emails. Dominik tags his next message 'freetime' and hits send. This message then is sent and delivered to Kay as soon as his schedule shows he is free. This allows for Dominik's message to be at the top of the message pile. In such a use case, method 400 can be implemented using enterprise level exchange servers so that access to Kay's calendar is available.

In a fourth use case, Dominik and Kay are having a back and forth conversation in regards to meeting up at a location. As in FIG. 11, a device can recognize potential keywords and provides prompts for the user to add one or more location-based tags. In such use cases, the device can further "learn" a writing style and heuristically provide tags automatically when messages are being generated later.

In a fifth use case, Kay receives a message from a colleague one evening while out to dinner, the message tagged with one or more of a tag #WORK and a tag *WORKTIME. The colleague asks in the message if an item could be brought from his desk in Waterloo to Tahoe as Kay is travelling to Tahoe to meet the colleague. Waking up late and dealing with family life, the conversation from the night before slips Kay's mind when he heads to the office. As the message is location-tagged and/or time-tagged, when Kay arrives at the office, he receives the message again as a reminder to pick up the requested item before leaving for Tahoe.

Hence, provided herein are implementations of location and time-based messaging using textual tags integrated within the text of a message. While location and time-based messaging can occur using special interfaces to specify a location and/or a time for delivering a message, such interfaces generally need to be provided as add-ons to, and/or in applications different from, a messaging application, such that a user is required to exit a messaging GUI and enter GUI for specifying a location and/or time for delivering the message. The location and time-based textual tags described herein obviate the need for such additional applications and interfaces. Hence provided herein is a method, system and apparatus for location and time-based messaging using textual tags in which a device and/or a server receives a message and an address of a destination device, the message comprising text for delivery to the destination device, the text comprising a text-based tag, the tag comprising one or more keywords associated with one or more of a location and a time to deliver the message to the destination device; the device and/or server processes the tag to associate one or more of the location and the time with the message; and, the device and/or server transmits the message for delivery to the destination device using the address, at one or more of the location and the time.

Those skilled in the art will appreciate that in some implementations, the functionality of devices 101, 105 and server 103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 105 and server 103 and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a processor, a memory, a communication interface, the processor configured to:
receive, at the processor, a message and an address of a destination device, the message comprising text for delivery to the destination device, the text comprising a text-based tag, the tag comprising one or more keywords associated with one or more of a location and a time to deliver the message to the destination device; when the one or more keywords are associated with the location, the tag further comprises a first given textual character designating that one or more of the keywords are associated with the location; and when the one or more keywords are associated with the time, the tag further comprises a second given textual character designating that one or more of the keywords are associated with the time, the second given textual character different from the first textual character;
process, at the processor, the tag to associate one or more of the location and the time with the message by extracting the one or more keywords from the tag, and comparing the one or more keywords to one or more of a contact file associated with the address and a calendar file associated with the address to extract one or more of the location and the time from one or more of the contact file and the calendar file; and,
transmit, using the communication interface, the message for delivery to the destination device using the address, at one or more of the location and the time.

2. The device of claim 1, wherein the processor is further configured to process the tag to associate the location with the message by:
extracting the one or more keywords from the tag;
inputting the one or more keywords to a mapping application; and,
receiving the location from the mapping application.

3. The device of claim 1, wherein the processor is further configured to:
input one more words in the text to one or more of a contact file and a mapping application; and,
populate the tag with a location from one or more of the contact file and the mapping application.

4. The device of claim 1, wherein the processor is further configured to transmit the message for delivery to the destination device using the address, at the time by:
determining a current time; and, when the time is about equal to the current time,
transmitting the message to the destination device.

5. The device of claim 1, wherein the tag comprises the first given textual character followed by the one or more keywords comprising respective text nickname defining the location, and not the location itself.

6. The device of claim 1, wherein the one or more keywords comprises respective text associated with a field of a contact file which in turn comprises: a respective text nickname of the location, the respective text nickname stored in the contact file in association with the location.

7. The device of claim 1, wherein the tag comprises the second given textual character followed by the one or more keywords comprising respective text indicating a type of activity associated with a field of a calendar application.

8. A method comprising:
at a device comprising a processor, a memory, and a communication interface, receiving, at the processor, a message and an address of a destination device, the message comprising text for delivery to the destination device, the text comprising a text-based tag, the tag comprising one or more keywords associated with one or more of a location and a time to deliver the message to the destination device; when the one or more keywords are associated with the location, the tag further comprises a first given textual character designating that one or more of the keywords are associated with the location; and when the one or more keywords are associated with the time, the tag further comprises a second given textual character designating that one or more of the keywords are associated with the time, the second given textual character different from the first textual character;
processing, at the processor, the tag to associate one or more of the location and the time with the message by extracting the one or more keywords from the tag, and comparing the one or more keywords to one or more of a contact file associated with the address and a calendar file associated with the address to extract one or more of the location and the time from one or more of the contact file and the calendar file; and, transmitting, using the communication interface, the message for delivery to the destination device using the address, at one or more of the location and the time.

9. The method of claim 8, wherein the processing the tag to associate the location with the message comprises:

extracting the one or more keywords from the tag;

inputting the one or more keywords to a mapping application; and, receiving the location from the mapping application.

10. The method of claim 8, further comprising:

inputting one more words in the text to one or more of a contact file and a mapping application; and, populating the tag with a location from one or more of the contact file and the mapping application.

11. The method of claim 8, wherein the transmitting the message for delivery to the destination device using the address, at the time comprises:

determining a current time; and, when the time is about equal to the current time, transmitting the message to the destination device.

12. The method of claim 8, wherein the tag comprises the first given textual character followed by the one or more keywords comprising respective text nickname defining the location, and not the location itself.

13. The method of claim 8, wherein the one or more keywords comprises respective text associated with a field of a contact file which in turn comprises: a respective text nickname of the location, the respective text nickname stored in the contact file in association with the location.

14. The method of claim 8, wherein the tag comprises the second given textual character followed by the one or more keywords comprising respective text indicating a type of activity associated with a field of a calendar application.

15. A non-transitory computer-readable medium storing a computer program, wherein execution of the computer program is for:

at a device comprising a processor, a memory, and a communication interface, receiving, at the processor, a message and an address of a destination device, the message comprising text for delivery to the destination device, the text comprising a text-based tag, the tag comprising one or more keywords associated with one or more of a location and a time to deliver the message to the destination device; when the one or more keywords are associated with the location, the tag further comprises a first given textual character designating that one or more of the keywords are associated with the location; and when the one or more keywords are associated with the time, the tag further comprises a second given textual character designating that one or more of the keywords are associated with the time, the second given textual character different from the first textual character;

processing, at the processor, the tag to associate one or more of the location and the time with the message by extracting the one or more keywords from the tag, and comparing the one or more keywords to one or more of a contact file associated with the address and a calendar file associated with the address to extract one or more of the location and the time from one or more of the contact file and the calendar file; and, transmitting, using the communication interface, the message for delivery to the destination device using the address, at one or more of the location and the time.

16. The non-transitory computer-readable medium of claim 15, wherein the tag comprises the first given textual character followed by the one or more keywords comprising respective text nickname defining the location, and not the location itself.

17. The non-transitory computer-readable medium of claim 15, wherein the one or more keywords comprises respective text associated with a field of a contact file which in turn comprises: a respective text nickname of the location, the respective text nickname stored in the contact file in association with the location.

18. The non-transitory computer-readable medium of claim 15, wherein the tag comprises the second given textual character followed by the one or more keywords comprising respective text indicating a type of activity associated with a field of a calendar application.

* * * * *